(12) United States Patent
Usukura et al.

(10) Patent No.: US 12,066,716 B2
(45) Date of Patent: Aug. 20, 2024

(54) ELECTRONIC DEVICE

(71) Applicant: Sharp Display Technology Corporation, Kameyama (JP)

(72) Inventors: Naru Usukura, Kameyama (JP); Akiko Itoh, Kameyama (JP); Koji Murata, Kameyama (JP); Keisuke Yoshida, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/126,820

(22) Filed: Mar. 27, 2023

(65) Prior Publication Data

US 2023/0314877 A1    Oct. 5, 2023

(30) Foreign Application Priority Data

Mar. 29, 2022  (JP) ................................. 2022-053739

(51) Int. Cl.
    *G02F 1/13357*  (2006.01)
    *G02F 1/1335*   (2006.01)
    *G02F 1/1347*   (2006.01)
    *G06F 1/16*     (2006.01)

(52) U.S. Cl.
    CPC .... *G02F 1/13362* (2013.01); *G02F 1/133528* (2013.01); *G02F 1/1347* (2013.01); *G06F 1/1616* (2013.01)

(58) Field of Classification Search
    None
    See application file for complete search history.

(56) References Cited

U.S. PATENT DOCUMENTS

| | | | |
|---|---|---|---|
| 2006/0034042 A1 | 2/2006 | Hisano et al. | |
| 2017/0069281 A1* | 3/2017 | Fukuoka | ............... G09G 3/346 |
| 2017/0075453 A1* | 3/2017 | Nakaizumi | ......... G06F 3/04883 |
| 2019/0227307 A1* | 7/2019 | Yamaguchi | ........ G02B 27/0101 |
| 2019/0227378 A1* | 7/2019 | Watanabe | ......... G02F 1/133533 |

FOREIGN PATENT DOCUMENTS

| | | |
|---|---|---|
| JP | H07294892 A | 11/1995 |
| JP | 2006053678 A | 2/2006 |

* cited by examiner

*Primary Examiner* — Shan Liu
(74) *Attorney, Agent, or Firm* — ScienBiziP, P.C.

(57) ABSTRACT

An electronic device includes a first display panel including a first display surface, and a second display panel including a second display surface and configured to be disposed such that light emitted from the first display surface is incident on the second display surface. The first display panel is configured such that light emitted from the first display surface and incident on the second display surface includes a large amount of P-polarization components. The second display panel is a reflection-type display panel, and includes a polarizer disposed on the second display surface and configured to absorb S-polarization components of incident light.

15 Claims, 26 Drawing Sheets

ELECTRONIC DEVICE

CROSS-REFERENCE TO RELATED APPLICATIONS

This application claims the benefit of priority to Japanese Patent Application Number 2022-053739 filed on Mar. 29, 2022. The entire contents of the above-identified application are hereby incorporated by reference.

BACKGROUND

Technical Field

The disclosure relates to an electronic device including two display panels. The electronic device is, for example, a foldable display device and a notebook computer.

In the related art, an electronic device including two display panels is known. For example, JP H7-294892 A discloses a liquid crystal display system including a reflection-type liquid crystal display panel, a transmission-type liquid crystal display panel, and a computer. This liquid crystal display system is, for example, a notebook computer in which the reflection-type liquid crystal display panel is disposed on a front side as a main display, and the transmission-type liquid crystal display panel is disposed on a hand side and used for a pen input or the like. Further, J P 2006-53678 A discloses a configuration in which a transmission-type liquid crystal display panel is disposed on a front side, a reflection-type liquid crystal display panel is disposed on a hand side as an input interface, and a light source for a backlight of the transmission-type liquid crystal display panel is also used as a front light of the reflection-type liquid crystal display panel.

SUMMARY

In the electronic devices described in JP H7-294892 A and JP 2006-53678 A, low power consumption is achieved by using the reflection-type liquid crystal display panel. The configuration in JP 2006-53678 A discloses a configuration in which the light source for illumination of the liquid crystal display panel is efficiently used, but there is still room for improving display quality of the reflection-type liquid crystal display panel.

The disclosure has an object to improve display quality of a reflection-type display panel in an electronic device including a display panel as a main display and the reflection-type display panel.

According to embodiments of the disclosure, solutions described in the following items are provided.

Item 1
   An electronic device including:
   a first display panel including a first display surface; and
   a second display panel including a second display surface and configured to be disposed such that light emitted from the first display surface is incident on the second display surface,
   wherein the first display panel is configured such that light emitted from the first display surface and incident on the second display surface includes a large amount of P-polarization components, and
   the second display panel is a reflection-type display panel, and includes a polarizer disposed on the second display surface and configured to absorb S-polarization components of incident light.

Item 2
   The electronic device according to item 1,
   wherein the first display panel includes an organic EL element layer, and a circular polarizer disposed on the first display surface side of the organic EL element layer.

Item 3
   The electronic device according to item 1,
   wherein the first display panel is a transmission-type display panel, and
   the first display panel includes a liquid crystal element layer, a first polarizer having an absorption axis parallel to a horizontal direction of the first display surface, a second polarizer having an absorption axis in a direction of absorbing a polarization component in a perpendicular direction of the first display surface, and a backlight, the first polarizer and the second polarizer facing each other with the liquid crystal element layer interposed therebetween, and the first display panel being configured to perform display in a normally black mode.

Item 4
   The electronic device according to item 3,
   wherein the second polarizer has an absorption axis inclined downward in the perpendicular direction of the first display surface from a normal direction of the first display surface.

Item 5
   The electronic device according to item 4,
   wherein the first polarizer is disposed on the first display surface side of the liquid crystal element layer.

Item 6
   The electronic device according to item 5, further including
   a third polarizer disposed on a side opposite to the liquid crystal element layer of the second polarizer, and having an absorption axis or a reflection axis parallel to the perpendicular direction of the first display surface.

Item 7
   The electronic device according to item 4,
   wherein the second polarizer is disposed on the first display surface side of the liquid crystal element layer.

Item 8
   The electronic device according to item 7,
   wherein the liquid crystal element layer is a liquid crystal element layer in a transverse electrical field mode, and a liquid crystal molecule in a liquid crystal layer of the liquid crystal element layer has positive dielectric anisotropy and is pre-tilted with a slow axis inclined downward in the perpendicular direction of the first display surface from the normal direction of the first display surface.

Item 9
   The electronic device according to item 8, further including
   a phase difference plate disposed between the liquid crystal element layer and the first polarizer or the second polarizer disposed on the first display surface side,
   wherein the phase difference plate has a slow axis inclined upward in the perpendicular direction of the first display surface from the normal direction of the first display surface.

Item 10
   The electronic device according to item 8 or 9,
   wherein the liquid crystal element layer is configured to further apply a vertical electrical field to the liquid crystal layer.

Item 11
The electronic device according to any of items 7 to 10, wherein the liquid crystal element layer is configured to apply a transverse electrical field substantially parallel to the horizontal direction of the first display surface.

Item 12
The electronic device according to any of items 7 to 11, wherein an inclination angle of the inclined absorption axis of the second polarizer from the normal direction is less in a lower portion than in an upper portion of the first display surface.

Item 13
The electronic device according to any of items 7 to 12, wherein the liquid crystal element layer includes a plurality of pixels, each of the plurality of pixels has a region including a color filter layer and a transparent region, and a liquid crystal layer in the transparent region is always in a black display state.

Item 14
The electronic device according to any of items 7 to 13, further including
a third polarizer disposed on a side opposite to the liquid crystal element layer of the first polarizer, and having an absorption axis or a reflection axis parallel to the horizontal direction of the first display surface.

Item 15
The electronic device according to item 5 or 6,
wherein the liquid crystal element layer
is a liquid crystal element layer in a transverse electrical field mode,
is configured such that a liquid crystal molecule in a liquid crystal layer of the liquid crystal element layer has positive dielectric anisotropy, and a transverse electrical field substantially parallel to the perpendicular direction of the first display surface is applied, and
is also configured to further apply a vertical electrical field to the liquid crystal layer.

Item 16
The electronic device according to item 15,
wherein the liquid crystal element layer includes a plurality of pixels, and
the vertical electrical field is configured to be generated by an electrode unevenly distributed on an upper side of each of the plurality of pixels in the perpendicular direction of the first display surface.

Item 17
The electronic device according to item 5 or 6,
wherein the liquid crystal element layer
is a liquid crystal element layer in a transverse electrical field mode,
is configured such that a liquid crystal molecule in a liquid crystal layer of the liquid crystal element layer has negative dielectric anisotropy, and a transverse electrical field substantially parallel to the horizontal direction of the first display surface is applied,
is also configured to further apply a vertical electrical field to the liquid crystal layer, and
performs display in an HAN mode.

Item 18
The electronic device according to any of items 1 to 17, further including
a processor and a storage device.

According to an embodiment of the disclosure, an electronic device including a transmission display panel and a reflective display panel and having improved display quality of the reflection-type display panel is provided.

BRIEF DESCRIPTION OF DRAWINGS

The disclosure will be described with reference to the accompanying drawings, wherein like numbers reference like elements.

DESCRIPTION OF EMBODIMENTS

Hereinafter, an electronic device according to an embodiment of the disclosure will be described with reference to the accompanying drawings. The electronic device according to the embodiment of the disclosure is not limited to those exemplified below. Hereinafter, a foldable notebook computer including a first display panel as a main display and a second display panel as a reflection-type display panel will be described as an example of the electronic device.

First, a structure and an operation of an electronic device 300 according to an embodiment of the disclosure will be described with reference to FIGS. 1 to 3.

Figure 1:
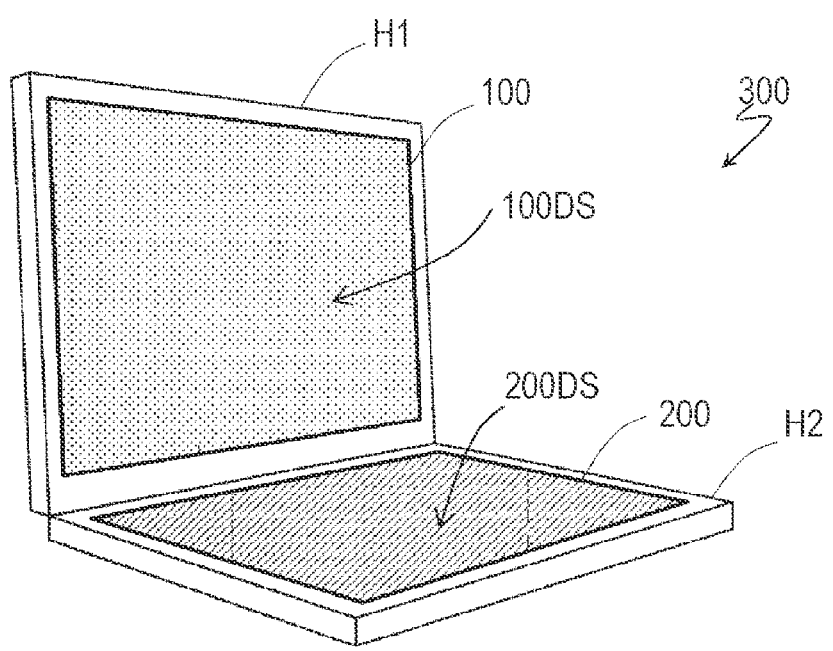
FIG. 1 is a schematic perspective view of an electronic device 300 according to an embodiment of the disclosure.

FIG. 1 is a schematic perspective view of the electronic device 300 according to the embodiment of the disclosure. The electronic device 300 includes a first display panel 100 including a first display surface 100DS, and a second display panel 200 including a second display surface 200DS. The first display panel 100 is housed in a housing H1, and the second display panel 200 is housed in a housing H2. For example, a processor and a storage device are housed in the housing H2. In addition, circuits similar to those of a known notebook computer, such as a power source circuit and a communication circuit, are housed in the housing H2. The housing H1 and the housing H2 are foldably connected to each other by, for example, a hinge (not illustrated). In other words, the second display panel 200 is configured to be disposed such that light emitted from the first display surface 100DS is incident on the second display surface 200DS, and is disposed such that the first display surface 100DS and the second display surface 200DS form an interior angle of about 90° to about 120° in use.

Figure 2:
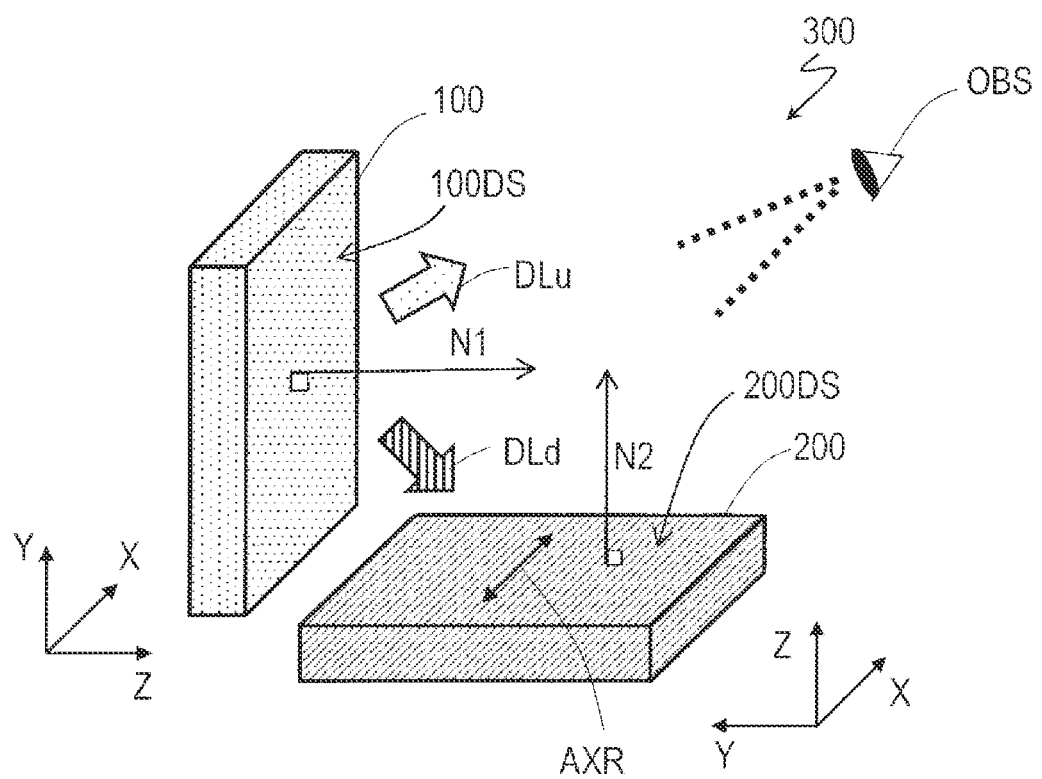
FIG. 2 is a perspective view schematically illustrating an arrangement of a first display panel 100 and a second display panel 200 included in the electronic device 300.

FIG. 2 illustrates a perspective view schematically illustrating an arrangement of the first display panel 100 and the second display panel 200. FIG. 3 illustrates a schematic perspective view illustrating an arrangement relationship between a polarization state of light emitted from the first display panel 100, and an axis AXR of the second display panel 200 and absorbs polarized light.

In order to define the arrangement of the first display panel 100 and the second display panel 200, an XYZ coordinate system is defined for each of the first display surface 100DS and the second display surface 200DS as illustrated in FIG. 2. A horizontal direction of each of the first display surface 100DS and the second display surface 200DS is an X-axis, a perpendicular direction is a Y-axis, a direction orthogonal to the X-axis and the Y-axis is a Z-axis, a normal direction of the first display surface 100DS is N1, and a normal direction of the second display surface 200DS is N2. Vectors N1 and N2 indicating the normal directions are directed toward an observer OBS side. N1 and N2 are parallel to the Z-axis. When the first display surface 100DS and the second display surface 200DS are regarded as a dial of a clock, the X-axis (positive) is in the 3 o'clock direction, the X-axis (negative) is in the 9 o'clock direction, the Y-axis (positive) is in the 12 o'clock direction, and the Y-axis (negative) is in the 6 o'clock direction.

As illustrated in FIG. 2, a light beam DLu and a light beam DLd are emitted from the first display surface 100DS. Here, the light beam DLu is a light beam emitted substantially upward from the normal direction N1 of the first display surface 100DS, and delivers an image displayed on the first display surface 100DS to the observer OBS. The light beam DLd is a light beam emitted substantially downward from the normal direction N1 of the first display surface 100DS, is incident on the second display surface 200DS, and is used for reflective display by the second display panel 200. In other words, the light beam DLd is used as a light beam of a front light with which the second display surface 200DS is illuminated.

In the electronic device 300 according to the embodiment of the disclosure, the first display panel 100 is configured such that light emitted from the first display surface 100DS and incident on the second display surface 200DS, that is, the light beam DLd includes a large amount of P-polarization components, and the second display panel 200 is a reflection-type display panel and includes a polarizer disposed on the second display surface 200DS so as to absorb S-polarization components of incident light.

Figure 3:
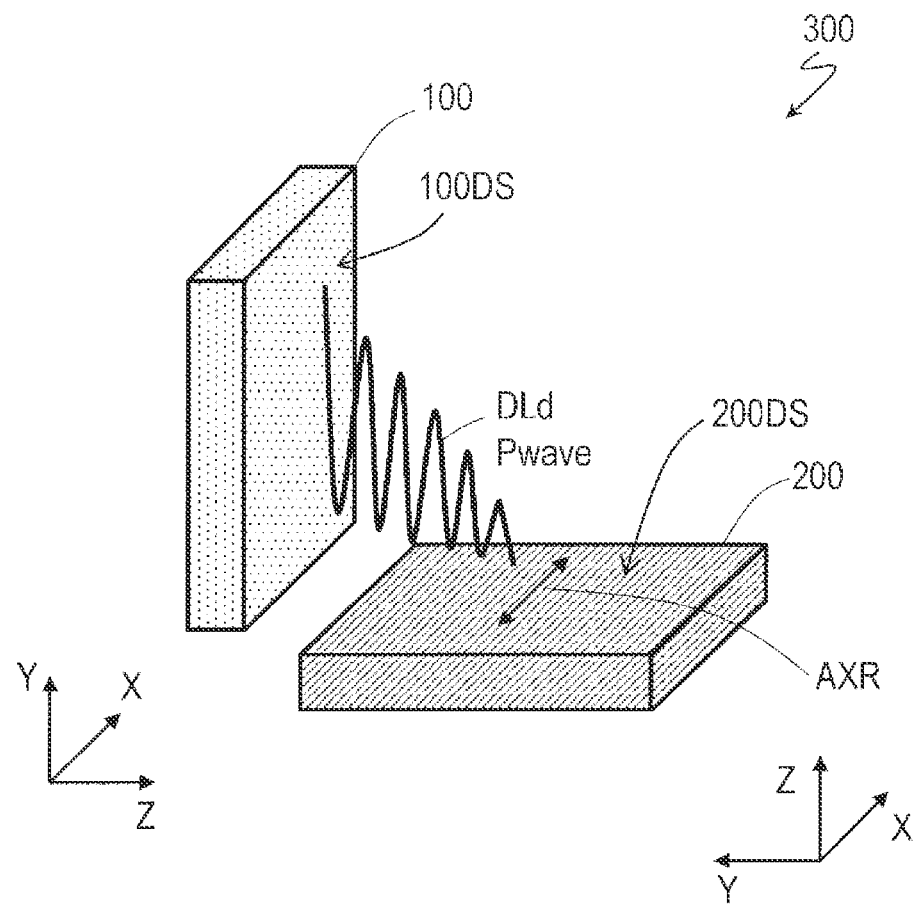
FIG. 3 is a schematic perspective view illustrating an arrangement relationship between a polarization state of light emitted from the first display panel 100 in the electronic device 300, and an axis AXR of the second display panel 200 and absorbs polarized light.

Next, FIG. 3 is referred. FIG. 3 is a schematic perspective view illustrating a relationship between a polarization state of light emitted from the first display panel 100, and the axis AXR of the second display panel 200 and absorbs polarized light.

As illustrated in FIG. 3, the light beam DLd emitted from the first display panel 100 toward the second display surface 200DS includes a large amount of the P-polarization components, and the second display panel 200 has the absorption axis AXR parallel to the horizontal direction (X-axis) of the second display surface 200DS so as to absorb the S-polarization components. When the second display panel 200 including the polarizer disposed so as to absorb the S-polarization components is irradiated with the light including a large amount of the P-polarization components in such a manner, the quality of reflective display by the second display panel 200 can be improved.

As well known, the S-polarization components in which an electrical field oscillates perpendicularly to an incident plane (here, parallel to a YZ plane) are easily reflected by a surface, and the P-polarization components in which an electrical field oscillates within the incident plane are hardly reflected by a surface. Therefore, the P-polarization components incident on the second display surface 200DS are not reflected so much by the surface, are not absorbed by the polarizer having the absorption axis AXR parallel to the horizontal direction (X-axis), and are effectively used for reflective display in the second display panel 200.

Figure 4:
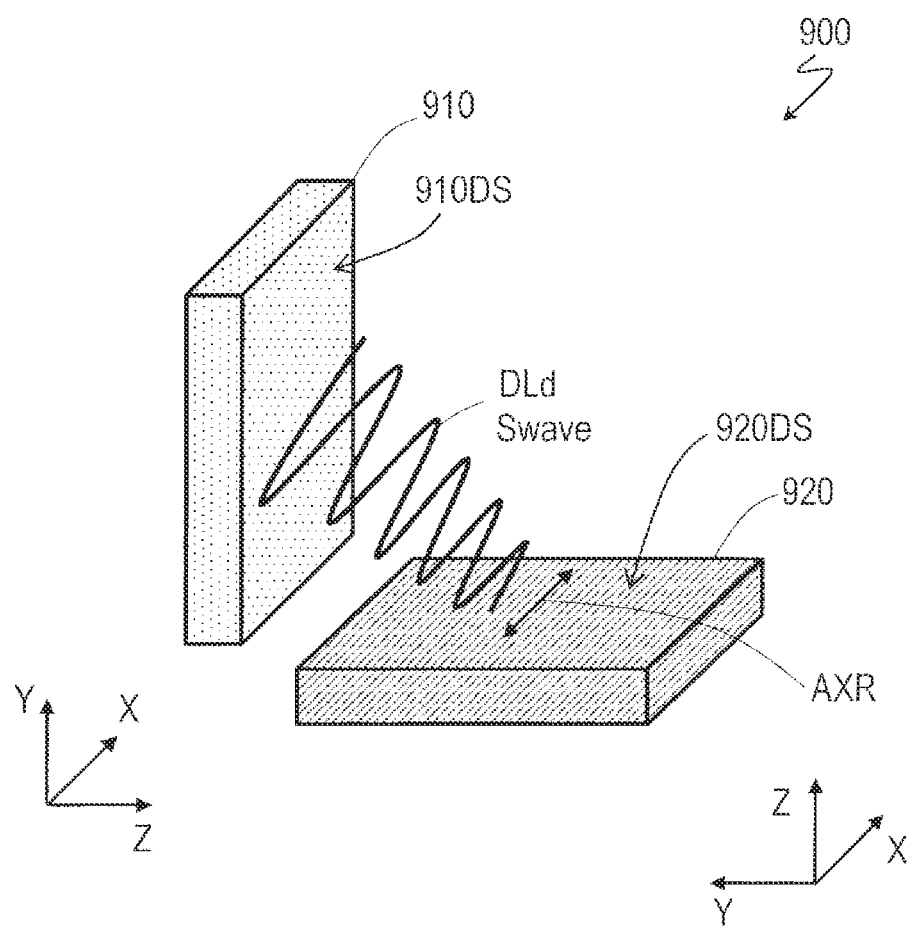
FIG. 4 is a schematic perspective view illustrating a relationship between a polarization state of light emitted from a first display panel 910 in an electronic device 900 according to a comparative example, and an axis Abx of a second display panel 920 and absorbs polarized light.

In contrast, an electronic device 900 according to a comparative example illustrated in FIG. 4 cannot obtain excellent reflective display. In the electronic device 900, since a first display panel 910 emits the light beam DLd including a large amount of the S-polarization components from a first display surface 910DS toward a second display surface 920DS of a second display panel 920, most of the light is reflected by the second display surface 920DS. Further, since the light incident on the second display device 920 without being reflected is absorbed by the polarizer having the absorption axis AXR parallel to the horizontal direction (X-axis), the amount of light used for reflective display is extremely less.

The reflection-type display panel used as the second display panel 200 is preferably a reflection-type liquid crystal display panel from a viewpoint of display quality, and a known reflection-type liquid crystal display panel can be widely used as long as it includes the polarizer having the absorption axis AXR parallel to the horizontal direction (X-axis). Further, a reflection-type display panel other than the liquid crystal display panel may be used depending on an application.

Hereinafter, a display panel suitably used as the first display panel will be described.

Figure 5:
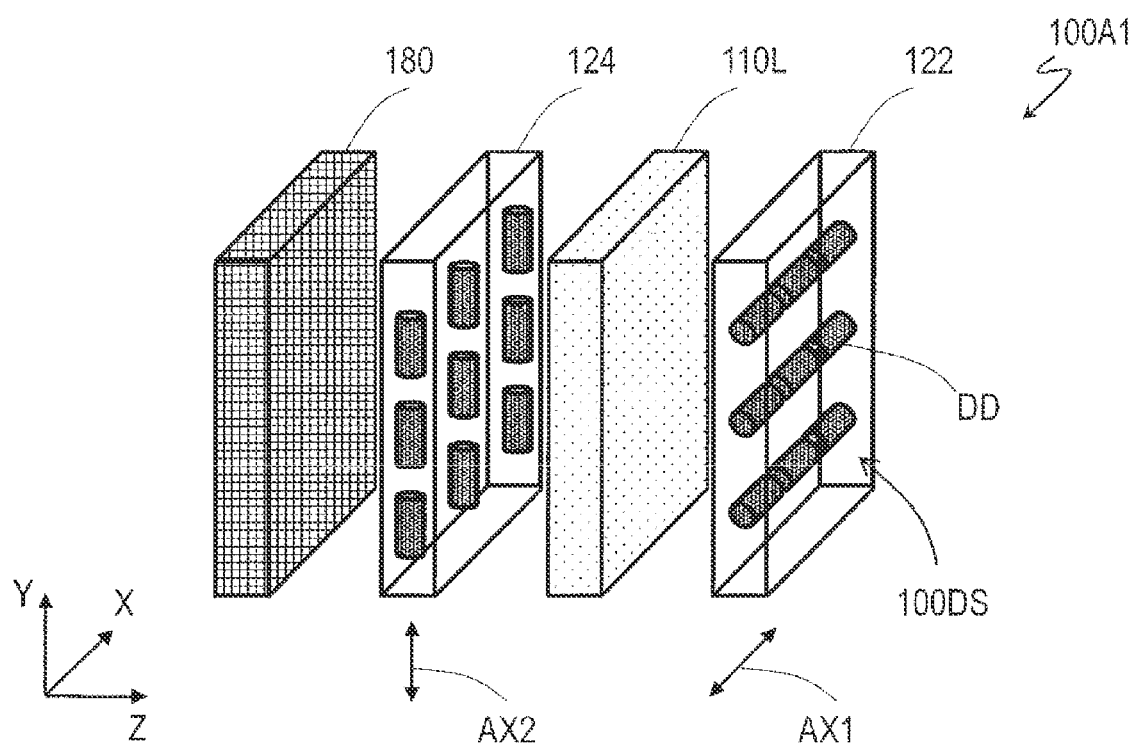
FIG. 5 is a schematic exploded perspective view of a transmission-type liquid crystal display panel 100A1.

FIG. 5 illustrates a schematic exploded perspective view of a transmission-type liquid crystal display panel 100A1 suitably used as the first display panel.

The transmission-type liquid crystal display panel 100A1 includes a liquid crystal element layer 110L, a first polarizer 122 having an absorption axis AX1 parallel to the horizontal direction (X-axis) of the first display surface 100DS, a second polarizer 124 having an absorption axis AX2 in a direction of absorbing a polarization component (P-polarization component) in a perpendicular direction of the first display surface 100DS, and a backlight 180.

The first polarizer 122 and the second polarizer 124 are disposed so as to face each other with the liquid crystal element layer 110L interposed therebetween, and the transmission-type liquid crystal display panel 100A1 is configured to perform display in a normally black mode. The light emitted from the first display surface 100DS of the transmission-type liquid crystal display panel 100A1 includes a large amount of the P-polarization components.

Here, the first polarizer 122 is disposed on the first display surface 100DS side of the liquid crystal element layer 110L, and the absorption axis AX2 of the second polarizer 124 is parallel to the perpendicular direction (Y-axis) of the first display surface 100DS. As will be exemplified later, the arrangement of the first polarizer 122 and the second polarizer 124 is not limited thereto. Further, since the second polarizer 124 only needs to absorb the P-polarization components of the light emitted toward the second display surface 200DS, the absorption axis AX2 may have an absorption axis inclined downward (the −Y-axis direction in the YZ plane, the 6 o'clock direction) in the perpendicular direction of the first display surface 100DS from the normal direction N1 of the first display surface 100DS. Note that, a cylinder in the drawing indicates a direction (parallel to the absorption axis) of a transition moment of light absorption of dichroic pigment molecules, but the polarizer is not limited to a dichroic polarizer.

The liquid crystal element layer 110L may be a liquid crystal element layer used in a known transmission-type liquid crystal display device, and may be, for example, an active matrix-type liquid crystal element layer. As will be described later, the liquid crystal element layer 110L includes, on a pixel-by-pixel basis, a back substrate, a front substrate, a liquid crystal layer disposed between the back substrate and the front substrate, and an electrode structure that applies a voltage for display to the liquid crystal layer. The electrode structure includes, for example, a pixel electrode and a common electrode (also referred to as a counter electrode). In the liquid crystal element layer 110L in a transverse electrical field mode such as an FFS mode, the pixel electrode and the common electrode are formed on the same substrate. In the liquid crystal element layer 110L in a vertical electrical field mode such as a VA mode and an HAN mode, the pixel electrode and the common electrode are formed on main surfaces on the liquid crystal layer side of the back substrate and the front substrate disposed so as to face each other with the liquid crystal layer interposed therebetween. The liquid crystal element layer 110L may include a drive circuit (a source driver or a gate driver) and a wiring line (a source bus line or a gate bus line) for supplying a voltage to the pixel electrode and the common electrode. Further, the liquid crystal element layer 110L may include a color filter layer for color display. Since the configuration of the liquid crystal element layer 110L is well known, a detailed description thereof will be omitted.

Further, a transmission-type display panel including a transmission-type display element layer (for example, an electrophoretic display element layer or an electrowetting display element layer) other than the liquid crystal element layer 110L can also be used as the first display panel.

Figure 6:
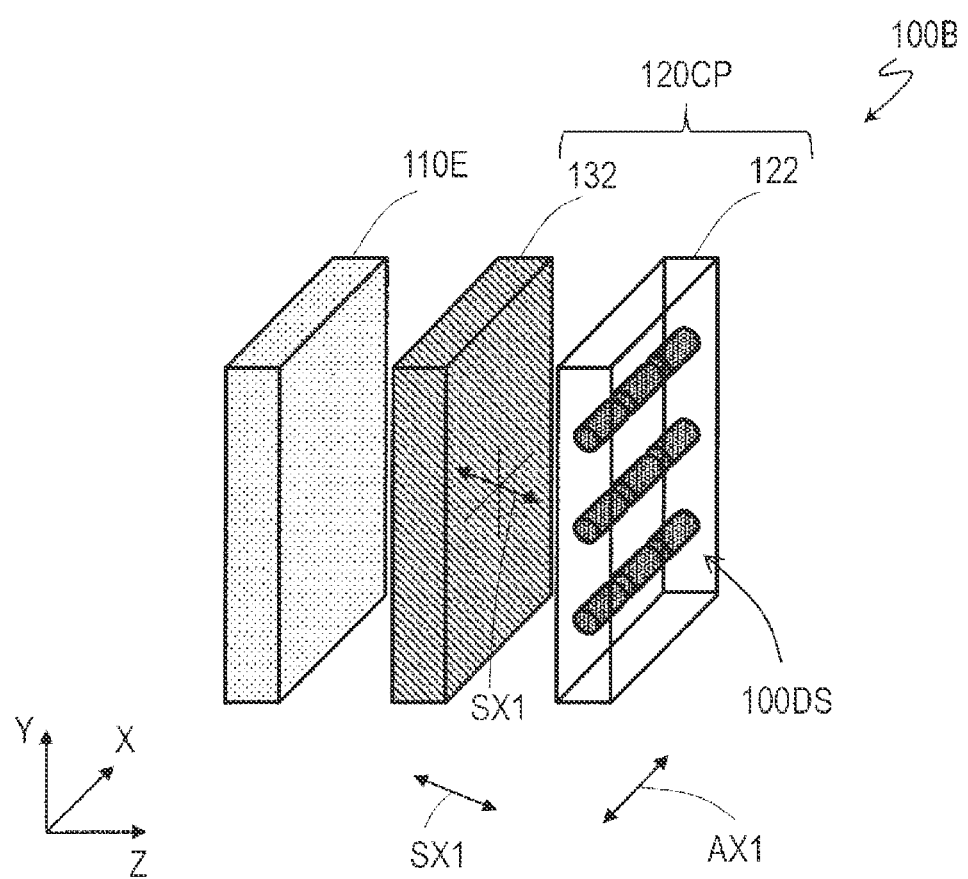
FIG. 6 is a schematic exploded perspective view of an organic EL display panel 100B.

FIG. 6 illustrates a schematic exploded perspective view of an organic EL display panel 100B suitably used as the first display panel.

The organic EL display panel 100B includes an organic EL element layer 110E, and a circular polarizer 120CP disposed on the first display surface 100DS side of the organic EL element layer 110E. The circular polarizer 120C includes the first polarizer 122 having the absorption axis AX1 parallel to the horizontal direction (X-axis), and a quarter-wavelength plate (¼λ plate) 132 disposed on the organic EL element layer 110E side of the first polarizer 122. The ¼λ plate 132 is disposed so that a slow axis SX1 of the ¼λ plate 132 forms an angle of 45° with the absorption axis AX1 of the circular polarizer 120C. The light emitted from the first display surface 100DS of the organic EL display panel 100B includes a large amount of the P-polarization components.

Hereinafter, another example of a transmission-type liquid crystal display panel suitably used as the first display panel will be described. In the following description, illustration of the backlight is omitted for simplicity.

Figure 7:
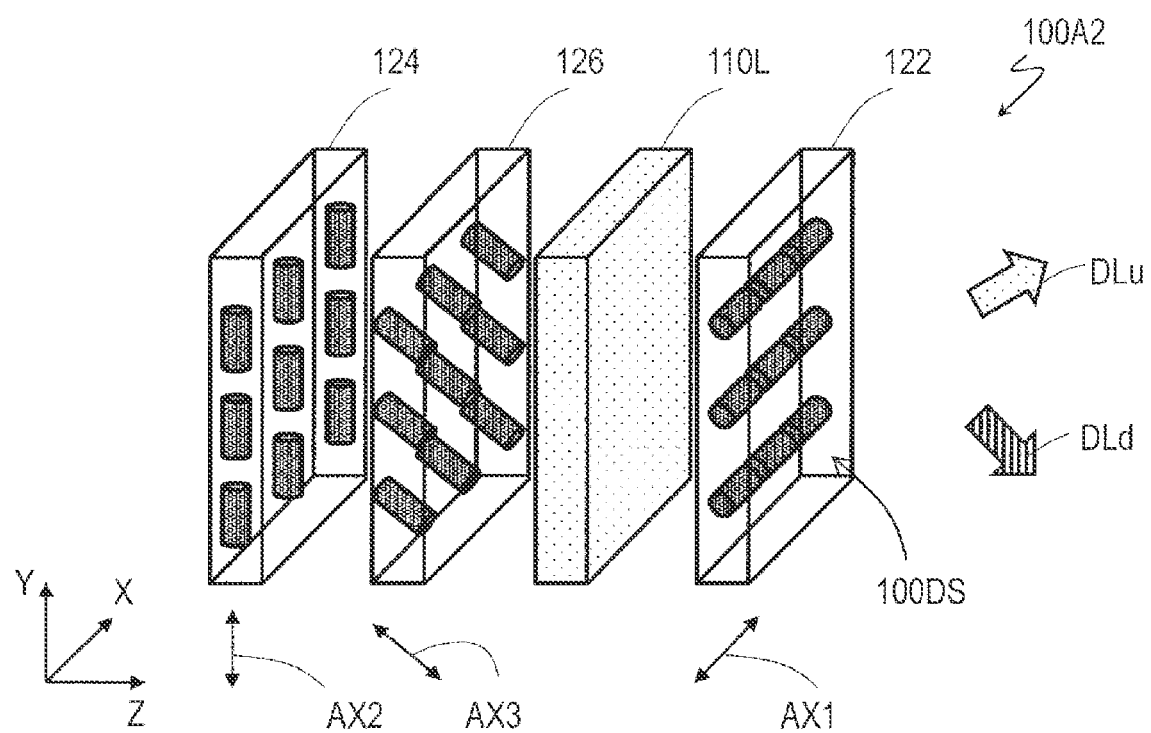
FIG. 7 is a schematic exploded perspective view of a transmission-type liquid crystal display panel 100A2.
Figure 8:
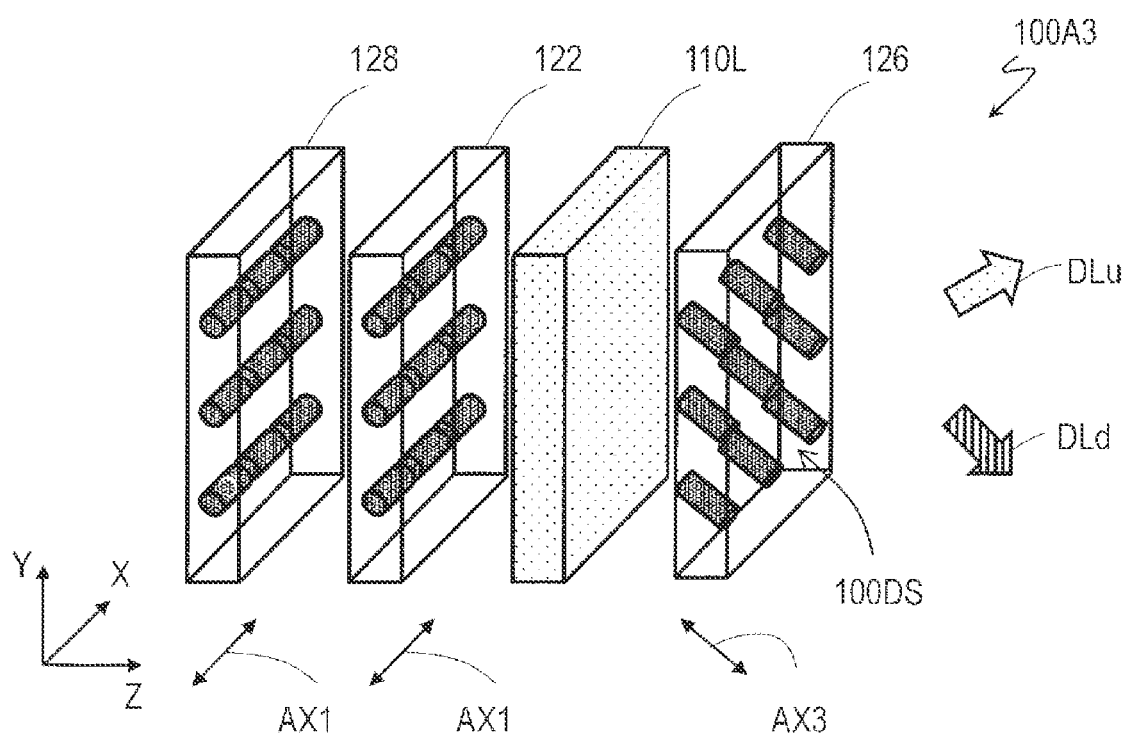
FIG. 8 is a schematic exploded perspective view of a transmission-type liquid crystal display panel 100A3.

FIG. 7 is a schematic exploded perspective view of a transmission-type liquid crystal display panel 100A2. FIG. 8 is a schematic exploded perspective view of a transmission-type liquid crystal display panel 100A3.

The liquid crystal display panels 100A2 and 100A3 both include the liquid crystal element layer 110L, the first polarizer 122 having the absorption axis AX1 parallel to the horizontal direction (X-axis) of the first display surface 100DS, a second polarizer 126 having an absorption axis AX3 in a direction of absorbing a polarization component (P-polarization component) in the perpendicular direction of the first display surface 100DS, and a backlight (not illustrated). The second polarizer 126 has the absorption axis AX3 inclined downward in the perpendicular direction (Y-axis) of the first display surface 100DS from the normal direction of the first display surface 100DS.

In the liquid crystal display panel 100A2 illustrated in FIG. 7, the first polarizer 122 is disposed on the first display surface 100DS side of the liquid crystal element layer 110L, and the second polarizer 126 having the absorption axis AX3 inclined downward in the perpendicular direction (Y-axis) of the first display surface 100DS from the normal direction of the first display surface 100DS is disposed on a side opposite to the first display surface 100DS of the liquid crystal element layer 110L. The liquid crystal display panel 100A2 further includes an optional third polarizer 124 having the absorption axis AX2 parallel to the perpendicular direction (Y-axis) of the first display surface 100DS.

The absorption axis AX3 of the second polarizer 126 is inclined downward at about 45° in the perpendicular direction (Y-axis) of the first display surface 100DS from the normal direction of the first display surface 100DS. Therefore, for the light beam DLu emitted from the first display surface 100DS toward an observer, the absorption axis AX3 and the absorption axis AX1 are substantially orthogonal to each other. Therefore, normal excellent display can be performed by the light beam DLu.

On the other hand, for the light beam DLd emitted from the first display surface 100DS toward the second display surface 200DS, the absorption axis AX3 of the second polarizer 126 is parallel to the traveling direction, and the light beam DLd is not absorbed by the second polarizer 126. Further, since the absorption axis AX1 of the first polarizer 122 is orthogonal to the oscillation direction of the electrical field of the P-polarization component, the light beam DLd is also not absorbed by the first polarizer 122. In other words, intensity of the light beam DLd emitted toward the second display surface 200DS does not depend on a state of the liquid crystal element layer 110L. Therefore, in the liquid crystal display panel 100A2, the second display surface 200DS of the reflection-type display panel 200 can be irradiated with P-polarized light regardless of a display state. The liquid crystal display panel 100A2 does not have the problem that intensity of light beams (the light beam DLu and the light beam DLd) emitted from the first display surface 100DS of the liquid crystal display panel 100A1 illustrated in FIG. 5 depends on a display state.

The second polarizer 126 including the inclined absorption axis AX3 may be manufactured by curing a liquid crystal material of a guest-host system by using the technique described in, for example, Shinya Watanabe, et al., "Vertically and Inclinedly Oriented Polarizers for Viewing Angle Control", SID Symposium Digest of Technical Papers, Volume 52, Number 1, May 2021, pp. 757-760.

The inclination angle of the absorption axis AX3 downward in the perpendicular direction (Y-axis) of the first display surface 100DS from the normal direction of the first display surface 100DS can be appropriately set in accordance with a size of the first display surface 100DS and the second display surface 200DS and a size of an interior angle, and is set in a range of, for example, 20° to 40°.

When a sufficient degree of polarization (S-polarized light) cannot be obtained by the second polarizer 126, the degree of polarization can be improved by providing the third polarizer 124. At this time, a degree of polarization of the third polarizer 124 may be lower than that of a polarizer used in a normal liquid crystal display device. A high degree of polarization has an effect of improving a contrast ratio, but it leads to a decrease in transmittance. Therefore, when a degree of polarization becomes higher than a certain level, a disadvantage due to a decrease in transmittance becomes greater. A polarizer used in a normal liquid crystal display device has a degree of polarization equal to or more than 99.9%, but a polarizer having a degree of polarization equal to or less than 99.0%, for example, can be used as the third polarizer 124 since the polarizer is used together with the second polarizer 126. Further, instead of the third polarizer 124, a reflection-type polarizer having a reflection axis parallel to the perpendicular direction (Y-axis) of the first display surface 100DS may be used.

The usage efficiency of light can be improved by using the reflection-type polarizer.

In the liquid crystal display panel 100A3 illustrated in FIG. 8, the second polarizer 126 having the absorption axis AX3 inclined downward in the perpendicular direction (Y-axis) of the first display surface 100DS from the normal direction of the first display surface 100DS is disposed on the first display surface 100DS side of the liquid crystal element layer 110L, and the first polarizer 122 is disposed on the side opposite to the first display surface 100DS side of the liquid crystal element layer 110L. The liquid crystal display panel 100A3 further includes an optional third polarizer 128 that is disposed on a side opposite to the liquid crystal element layer 110L of the first polarizer 122 and has the absorption axis AX1 parallel to the horizontal direction (X-axis) of the first display surface 100DS. The third polarizer 128 exhibits an advantageous effect similar to that of the third polarizer 124 in the liquid crystal display panel 100A2.

In the liquid crystal display panel 100A3, the S-polarization components are absorbed by the first polarizer 122 having the absorption axis AX1 and guided to the liquid crystal element layer 110L. For the light beam DLu subsequently emitted toward an observer through the second polarizer 126 via the liquid crystal element layer 110L, the absorption axis AX3 and the absorption axis AX1 are substantially orthogonal to each other. Therefore, normal excellent display can be performed by the light beam DLu.

On the other hand, for the light beam DLd emitted from the first display surface 100DS toward the second display surface 200DS, the absorption axis AX3 of the second polarizer 126 is parallel to the traveling direction, and the light beam DLd is not absorbed by the second polarizer 126. When a reflection-type polarizer is used as the third polarizer, the liquid crystal display panel 100A3 can increase the intensity of the light beam DLd further than that of the liquid crystal display panel 100A2. However, in the liquid crystal display panel 100A3, the light passing through the liquid crystal element layer 110L contains the S-polarization components depending on a state of the liquid crystal element layer 110L, and thus display quality may be deteriorated due to surface reflection on the second display surface 200DS.

There is no particular limitation on an operation mode (display mode) of the liquid crystal element layer 110L, and a transverse electrical field mode (for example, a fringe field switching (FFS) mode), a vertical electrical field mode (for example, a vertical alignment (VA) mode, a hybrid alignment nematic (HAN) mode, or a twisted nematic (TN) mode), or the like can be used. For example, by combining the liquid crystal element layer 110L in the FFS mode, the polarizer 122 for a general liquid crystal display device, and the inclined polarizer 126, a contrast ratio of 1000:1 can be obtained in a front view.

Next, an example of the liquid crystal element layer 110L will be described with reference to FIGS. 9 to 26.

Figure 9:
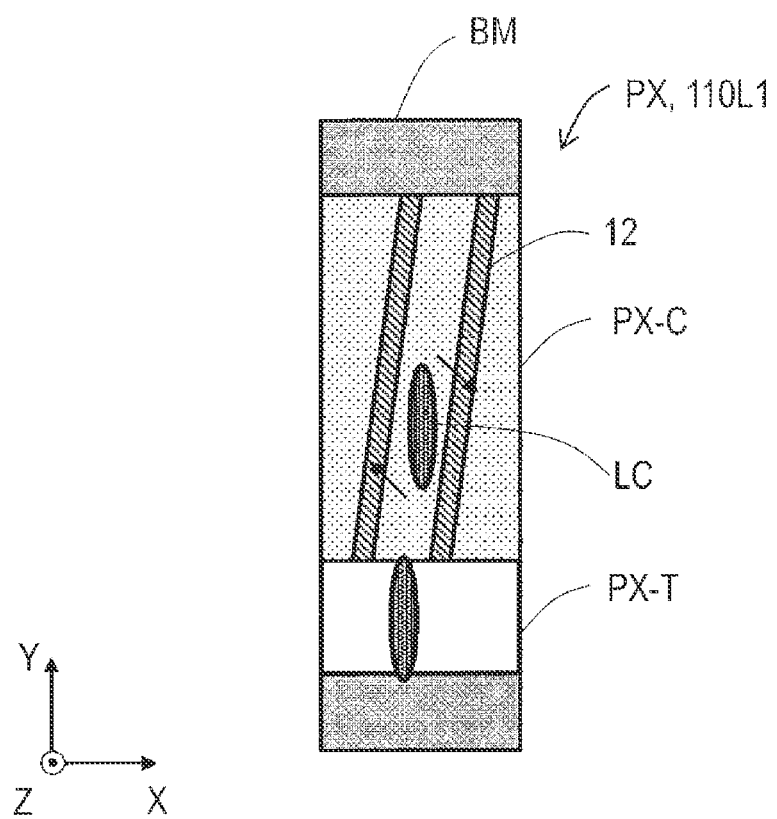
FIG. 9 is a schematic plan view of a pixel PX of a liquid crystal element layer 110L1.

FIG. 9 illustrates a schematic plan view of a pixel PX of a liquid crystal element layer 110L1. The liquid crystal element layer 110L1 is a liquid crystal element layer in a known transverse electrical field mode (for example, the FFS mode), and illustration of a configuration other than a pixel electrode 12 having a comb shape is omitted. A reference sign BM in FIG. 9 indicates a black matrix that shields a gate line. The liquid crystal element layer 110L includes a plurality of the pixels PX. Each of the plurality of pixels has a region PX-C including a color filter layer and a transparent region PX-T that transmits visible light (white) in all wavelength ranges. A liquid crystal layer in the transparent region PX-T is always in a black display state. In other words, the pixel electrode 12 is not included in the transparent region PX-T, and liquid crystal molecules LC are configured to maintain an initial alignment state. By providing the transparent region PX-T in each of the pixels in such a manner, the amount of light applied to the reflection-type display panel can be increased without deteriorating display quality of a liquid crystal display panel (for example, the liquid crystal display panel 100A3) in a normally black mode.

Figure 10:
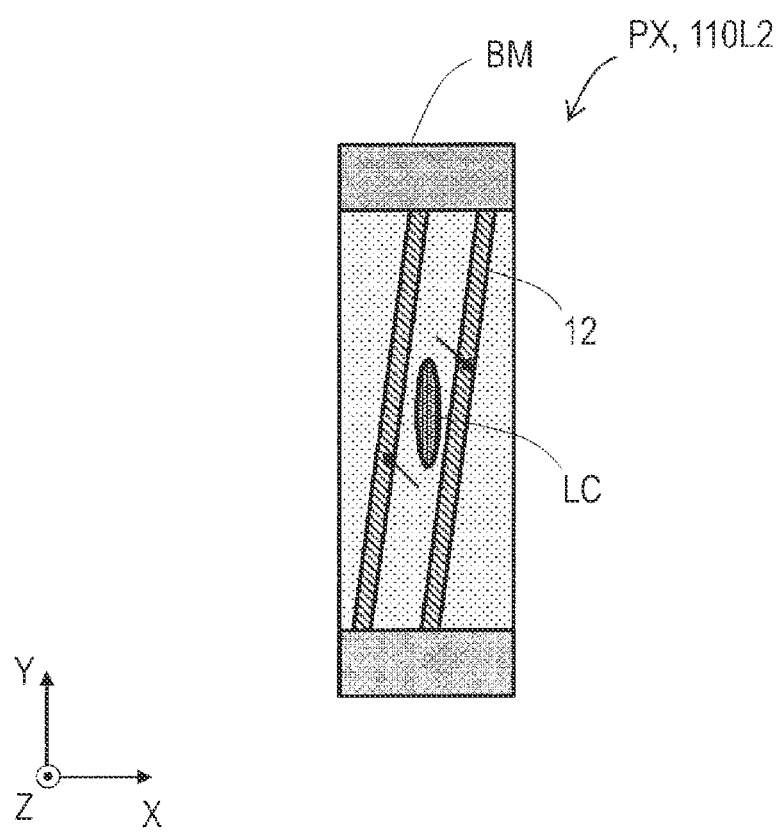
FIG. 10 is a schematic plan view of the pixel PX of a liquid crystal element layer 110L2.
Figure 11:
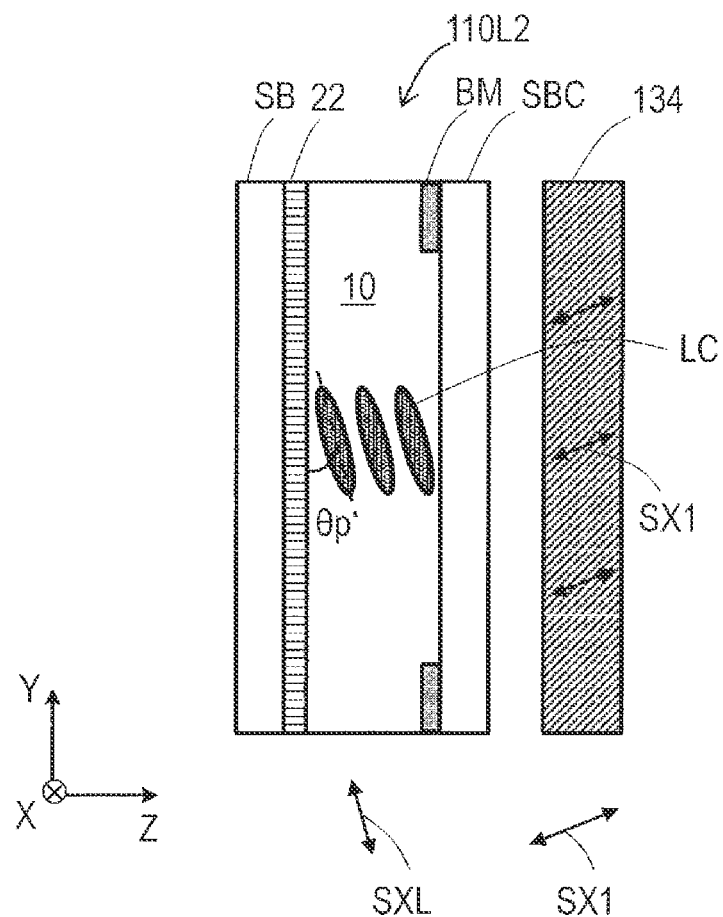
FIG. 11 is a schematic cross-sectional view of the pixel PX of the liquid crystal element layer 110L2.

FIG. 10 illustrates a schematic plan view of the pixel PX of a liquid crystal element layer 110L2, and FIG. 11 illustrates a schematic cross-sectional view of the pixel PX of the liquid crystal element layer 110L2. The liquid crystal element layer 110L2 is also a liquid crystal element layer in a known transverse electrical field mode (for example, the FFS mode), and a detailed description thereof will be omitted.

In FIG. 11, a reference sign SB represents a substrate, and a reference sign SBC represents a substrate including a color filter layer.

The liquid crystal element layer 110L2 is a liquid crystal element layer in a transverse electrical field mode, and the liquid crystal molecule LC in a liquid crystal layer 10 of the liquid crystal element layer has positive dielectric anisotropy and is pre-tilted with a slow axis SXL inclined downward in the perpendicular direction (Y-axis) of the first display surface 100DS from the normal direction of the first display surface 100DS. A pre-tilt angle θp is regulated by an alignment film 22, and is preferably equal to or more than 20°, for example. With the pre-tilt angle at 20°, an influence of optical anisotropy of the liquid crystal layer 10 on the light incident from the air at an angle of about 30° (60° from the normal line) can be substantially eliminated. By providing such a high pre-tilt angle to the liquid crystal molecules LC, a change in a polarization state due to a state of the liquid crystal element layer 110L2 can be suppressed, and thus the reflection-type display panel can be sufficiently illuminated regardless of a display state of the liquid crystal display panel 100A3, for example.

Furthermore, a phase difference plate 134 may be further disposed between the liquid crystal element layer 110L2 and the first polarizer 122 or the second polarizer 126 disposed on the first display surface side 100DS. The phase difference plate 134 has the slow axis SX1 inclined upward in the perpendicular direction (Y-axis) of the first display surface 100DS from the normal direction of the first display surface 100DS. When the liquid crystal molecules LC are inclined, a viewing angle on the left and right is slightly narrow, but the viewing angle on the left and right can be widened by providing such a phase difference plate (negative A plate) 134.

Figure 12:
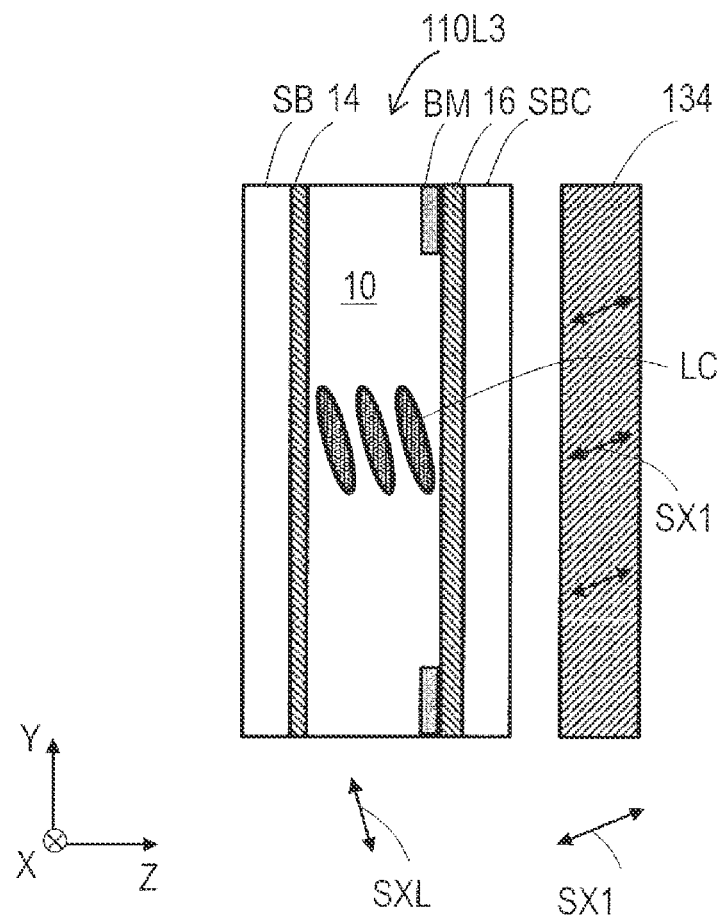
FIG. 12 is a schematic cross-sectional view of the pixel PX of a liquid crystal element layer 110L3.

FIG. 12 illustrates a schematic cross-sectional view of the pixel PX of a liquid crystal element layer 110L3. Similarly to the liquid crystal element layer 110L2, the liquid crystal element layer 110L3 is also a liquid crystal element layer in a known transverse electrical field mode (for example, the FFS mode), and includes electrodes 14 and 16 that can apply a vertical electrical field to the liquid crystal layer 10 in addition to the liquid crystal element layer 110L2.

By applying a vertical electrical field to the liquid crystal layer 10, similarly to the liquid crystal element layer 110L2, a change in a polarization state due to a state of the liquid crystal element layer 110L3 can be suppressed, and thus the reflection-type display panel can be sufficiently illuminated regardless of a display state of the liquid crystal display panel 100A3, for example.

When a method for controlling a tilt angle of the liquid crystal molecules LC by the vertical electrical field is used in such a manner, strength of the vertical electrical field applied to the liquid crystal layer 10 can be changed according to a position of the liquid crystal element layer 110L3 by dividing the electrode 16, for example.

Figure 13:
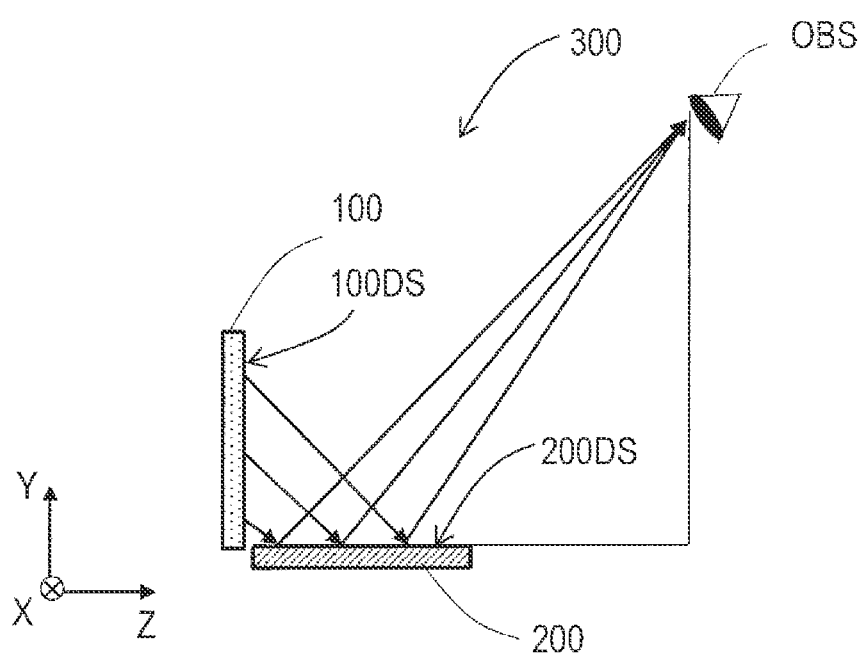
FIG. 13 is a side view schematically illustrating a path of a light beam reaching an observer when viewing the electronic device 300.

For example, when the electronic device 300 is a notebook computer, FIG. 13 illustrates a side view schematically illustrating a path of a light beam reaching an observer when viewing the electronic device 300. Since a specular reflection component greatly contributes to reflective display of a reflection-type liquid crystal display panel, FIG. 13 illustrates an optical path of specular reflection light.

As illustrated in FIG. 13, an emission angle (angle from the normal direction of the first display surface 100DS) from the transmission-type display panel 100 of a light beam reaching the observer OBS is less in a lower portion than in an upper portion of the first display surface 100DS. For example, when the size of each of the display panels 100 and 200 is 20 cm, a position of the observer OBS is 40 cm from a left end of the reflection-type display panel 200, and a height is 40 cm, an emission angle of the light reaching the observer OBS is about 45° in the upper portion of the first display surface 100DS and about 34° in the lower portion.

A tilt angle of the liquid crystal molecules LC in the liquid crystal element layer 110L3 is preferably controlled so as to be less in the lower portion than in the upper portion in accordance with a distribution of the emission angle described above.

Figure 14:
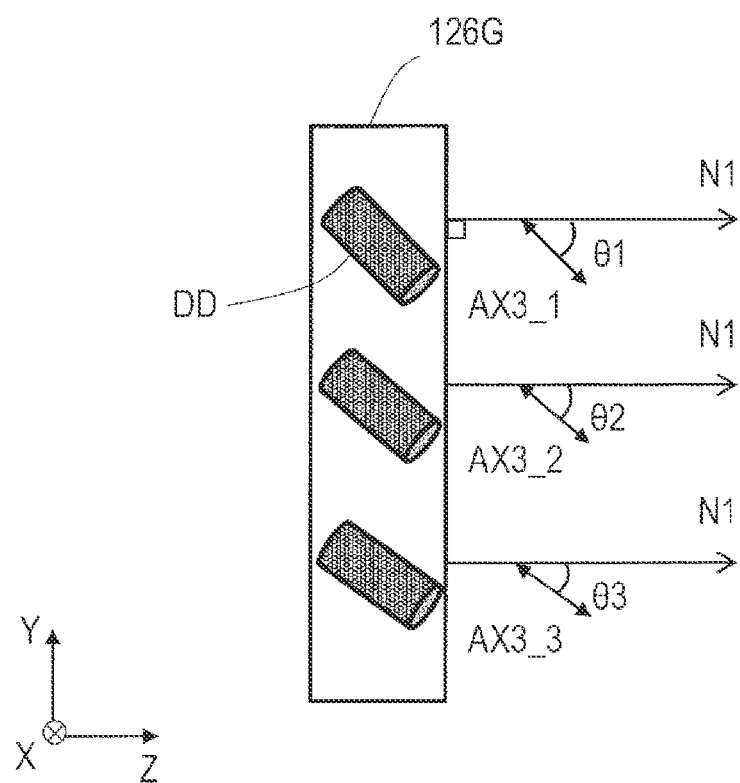
FIG. 14 is a schematic cross-sectional view illustrating a distribution of an absorption axis in a polarizer 126G.

For the same reason, an inclination angle, from the normal direction of the first display surface 100DS, of the absorption axis AX3 of the second polarizer 126 in which the absorption axis is inclined, which is illustrated in FIGS. 7 and 8, is preferably less in the lower portion than in the upper portion of the first display surface 100DS. FIG. 14 is a schematic cross-sectional view illustrating a distribution of an absorption axis in a polarizer 126G having a distribution of such an absorption axis.

Inclination angles θ1, θ2, and θ3 of inclined absorption axes AX3_1, AX3_2, and AX3_3 of the second polarizer 126G illustrated in FIG. 14 from the normal direction N1 are less in the lower portion than in the upper portion of the first display surface, and θ1>θ2>θ3. In this way, by reducing the inclination angle θ of the absorption axis AX3 stepwisely or continuously from the upper portion to the lower portion of the first display surface 100DS, the reflection-type display panel 200 can be effectively illuminated, and thus reflective display of higher quality can be provided.

Next, an example of a liquid crystal element layer suitably used as the liquid crystal element layer 110L of the transmission-type liquid crystal display panel 100A1 illustrated in FIG. 5 will be described with reference to FIGS. 15 to 26.

Figure 15:
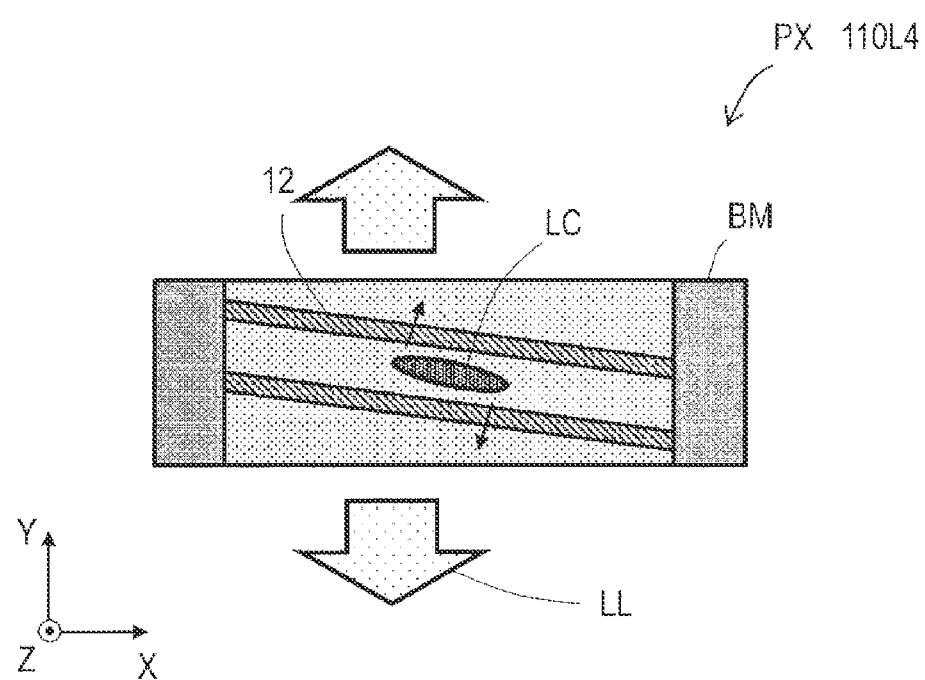
FIG. 15 is a schematic plan view of the pixel PX of a liquid crystal element layer 110L4.
Figure 16:
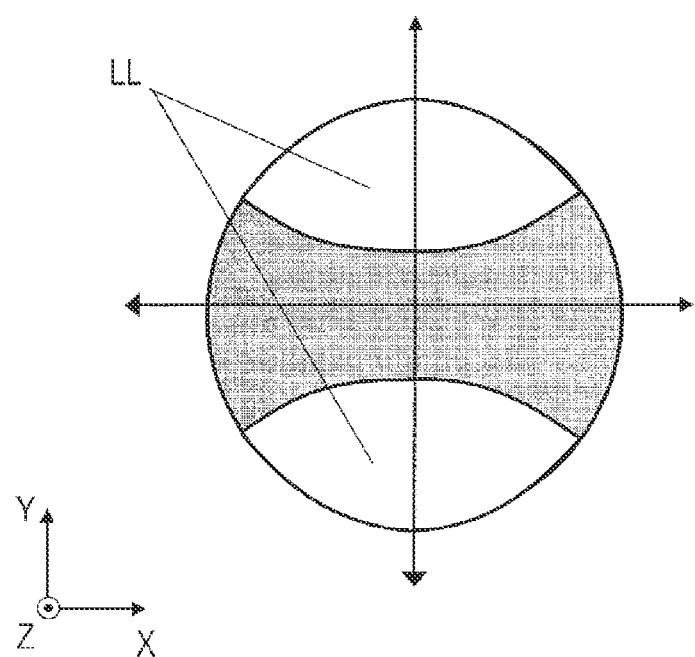
FIG. 16 is a schematic isocontrast line diagram of the liquid crystal element layer 110LA.
Figure 17:
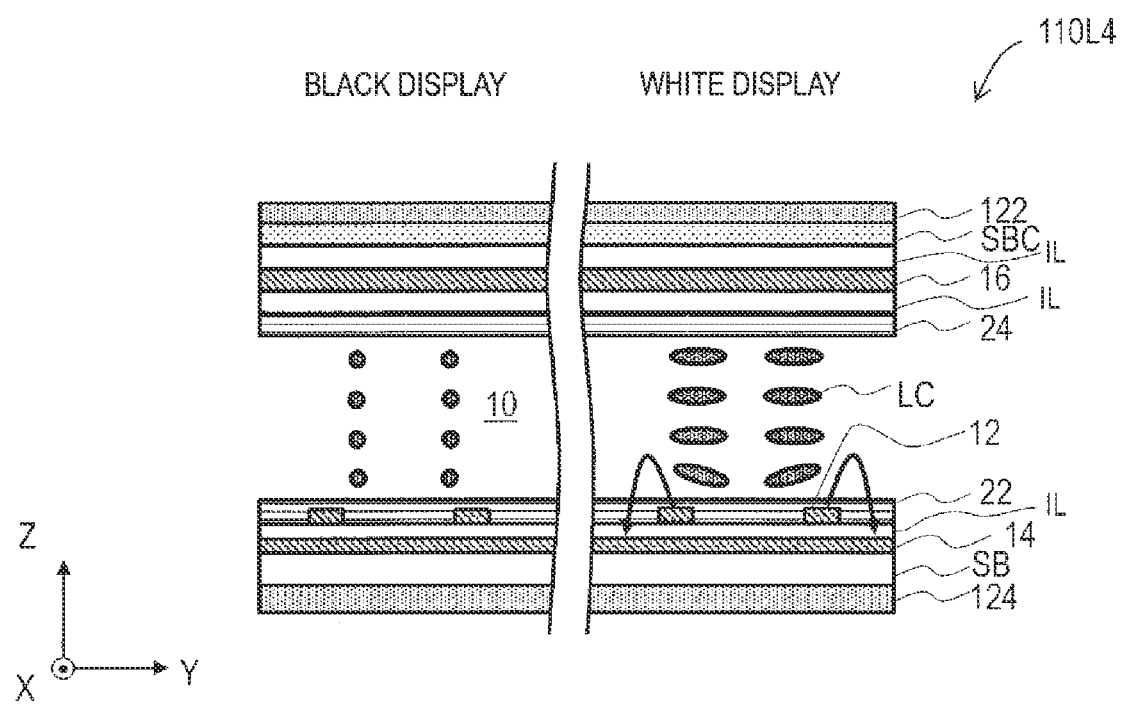
FIG. 17 is a schematic cross-sectional view of the liquid crystal element layer 110L4 (display mode).
Figure 18:
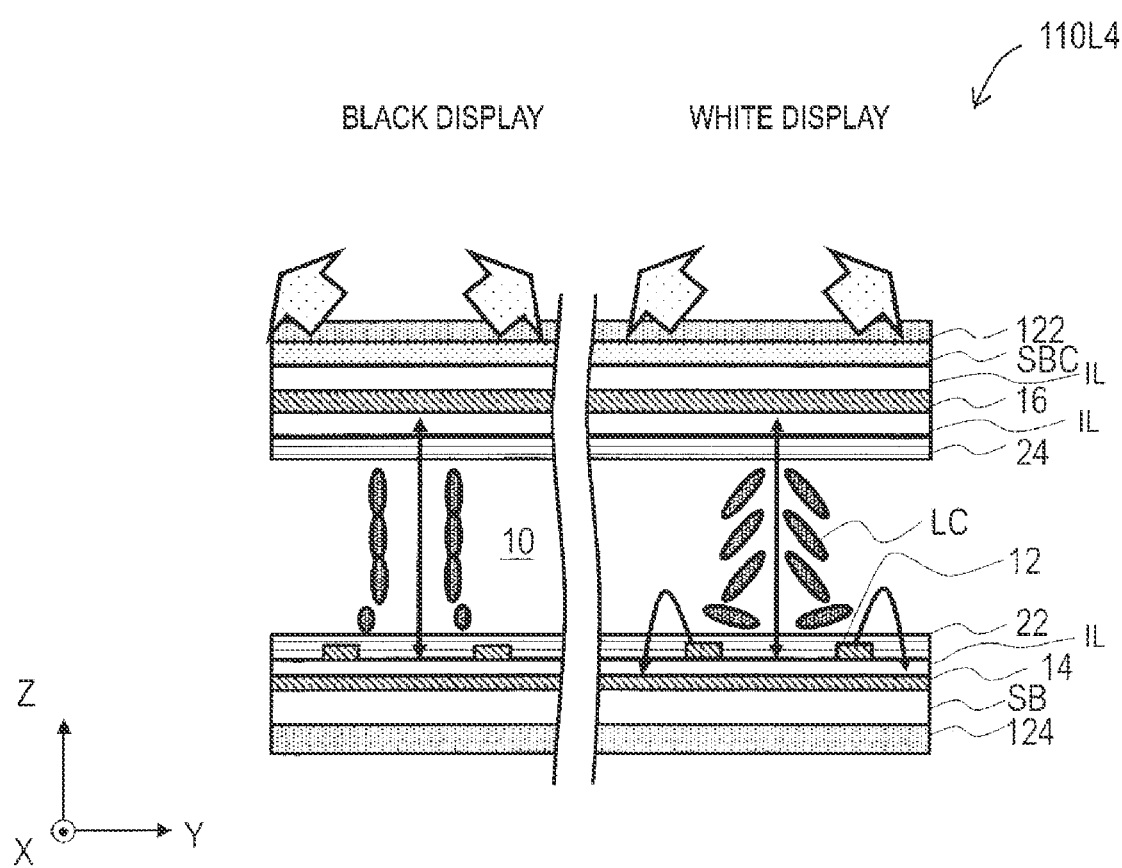
FIG. 18 is a schematic cross-sectional view of the liquid crystal element layer 110LA (illumination mode).

First, a liquid crystal element layer 110L4 will be described with reference to FIGS. 15 to 18. FIG. 15 is a schematic plan view of the pixel PX of the liquid crystal element layer 110L4. FIG. 16 is a schematic isocontrast line diagram of the liquid crystal element layer 110L4. FIG. 17 is a schematic cross-sectional view (display mode) of the liquid crystal element layer 110L4. FIG. 18 is a schematic cross-sectional view (illumination mode) of the liquid crystal element layer 110L4.

By controlling an operation of the liquid crystal element layer 110L4, switching is performed between a display mode of performing display by the transmission-type liquid crystal display panel 100A1 and an illumination mode of actively performing illumination of the reflection-type display panel 200.

The liquid crystal element layer 110L4 is a liquid crystal element layer in a transverse electrical field mode (for example, the FFS mode), is configured such that the liquid crystal molecule LC (Δn=0.1) in the liquid crystal layer 10 has positive dielectric anisotropy, and a transverse electrical field substantially parallel to the perpendicular direction of the first display surface 100DS is applied, and is also configured such that a vertical electrical field can be further applied to the liquid crystal layer 10. As illustrated in FIG. 15, the pixel PX has a shape elongated in the horizontal direction (X-axis direction), and leakage light LL leaks in the vertical direction (Y-axis direction) and indicates an isocontrast line as illustrated in FIG. 16. A size of one pixel is, for example, 20.2 μm in length×60.55 μm in width, a comb electrode width is 4 μm, an interelectrode distance is 4 μm, and a thickness (cell thickness) of the liquid crystal layer 10 is 3.3 μm.

The liquid crystal element layer 110L4 includes the common electrode 14 and the pixel electrode 12 on the substrate SB, and includes the electrode 16 for applying a vertical electrical field to the liquid crystal layer 10 on the color filter substrate SBC including the color filter layer disposed so as to face the substrate SB with the liquid crystal layer 10 interposed therebetween. The liquid crystal element layer 110L4 includes an insulating layer IL, the alignment film 22, and an alignment 24.

As illustrated in FIG. 17, by applying a voltage between the pixel electrode 12 and the common electrode 14, a fringe electrical field is generated, and the liquid crystal display panel operates as a liquid crystal display panel in a normal FFS mode. On the other hand, as illustrated in FIG. 18, when a voltage is also applied to the opposite electrode 16 and a vertical electrical field is generated, the liquid crystal molecules normally aligned horizontally rotate in a state of rising obliquely under an influence of the vertical electrical field, and thus light can be intentionally caused to leak in right and left oblique directions. The leaking light is used as illumination of the reflection-type display panel. At this time, display in a normal display mode can be observed when viewed from the front.

Figure 19:
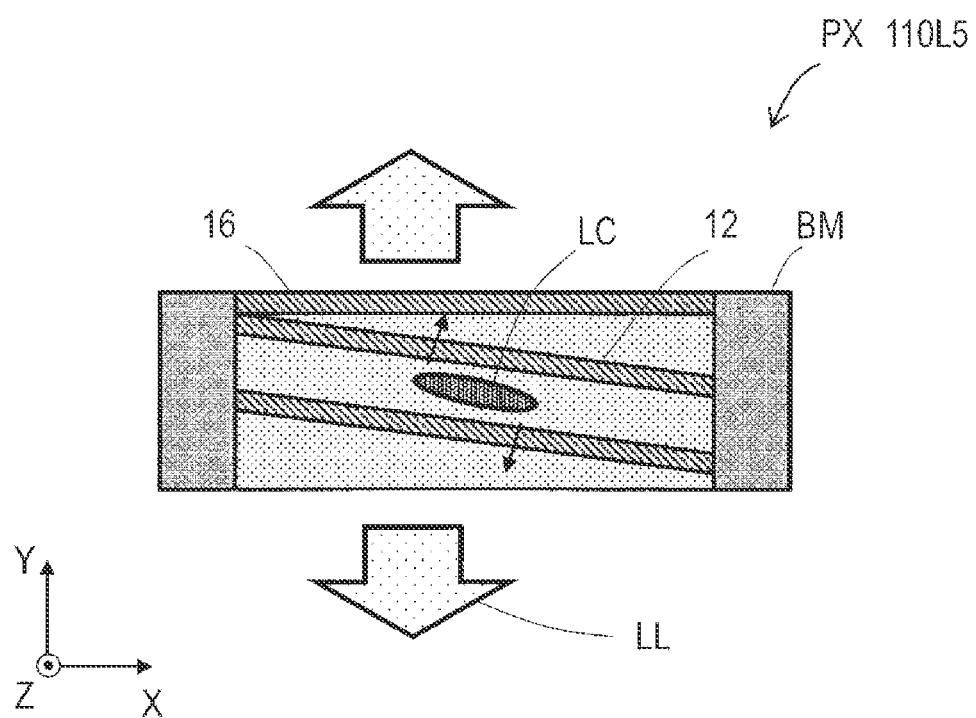
FIG. 19 is a schematic plan view of the pixel PX of a liquid crystal element layer 110L5.
Figure 20:
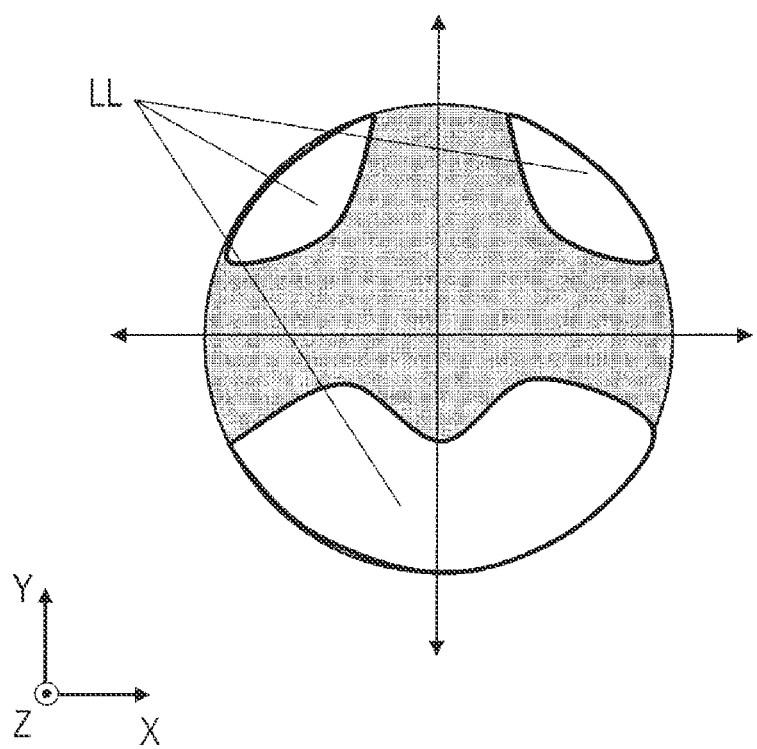
FIG. 20 is a schematic isocontrast line diagram of the liquid crystal element layer 110L5.
Figure 21:
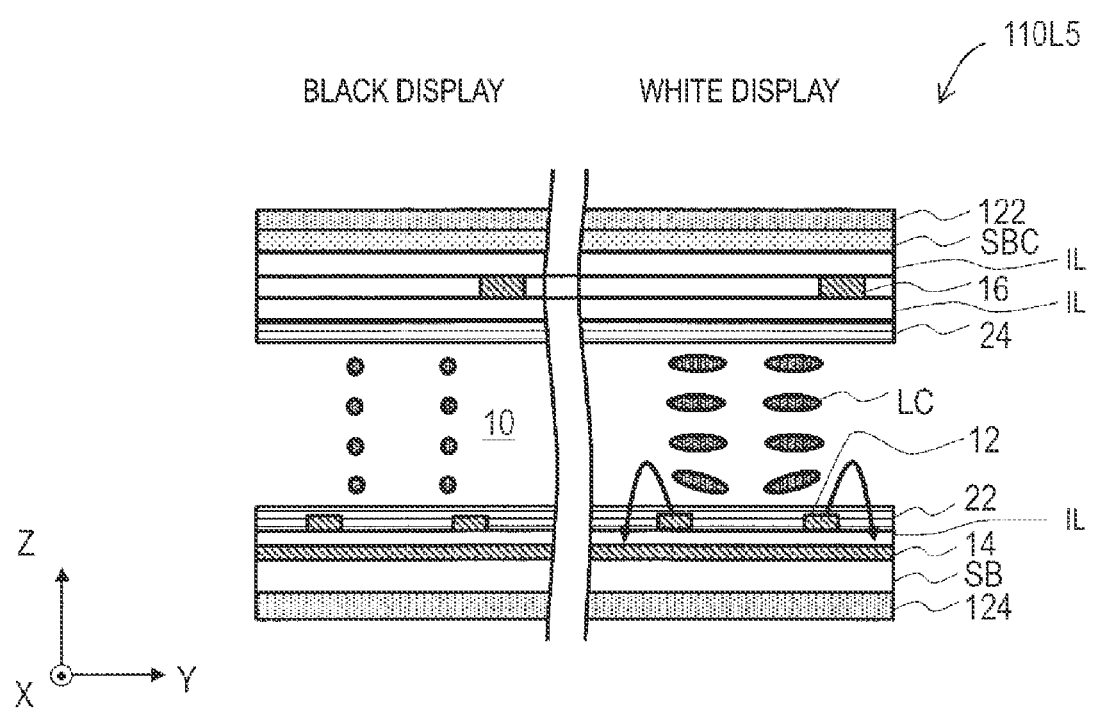
FIG. 21 is a schematic cross-sectional view of the liquid crystal element layer 110L5 (display mode).
Figure 22:
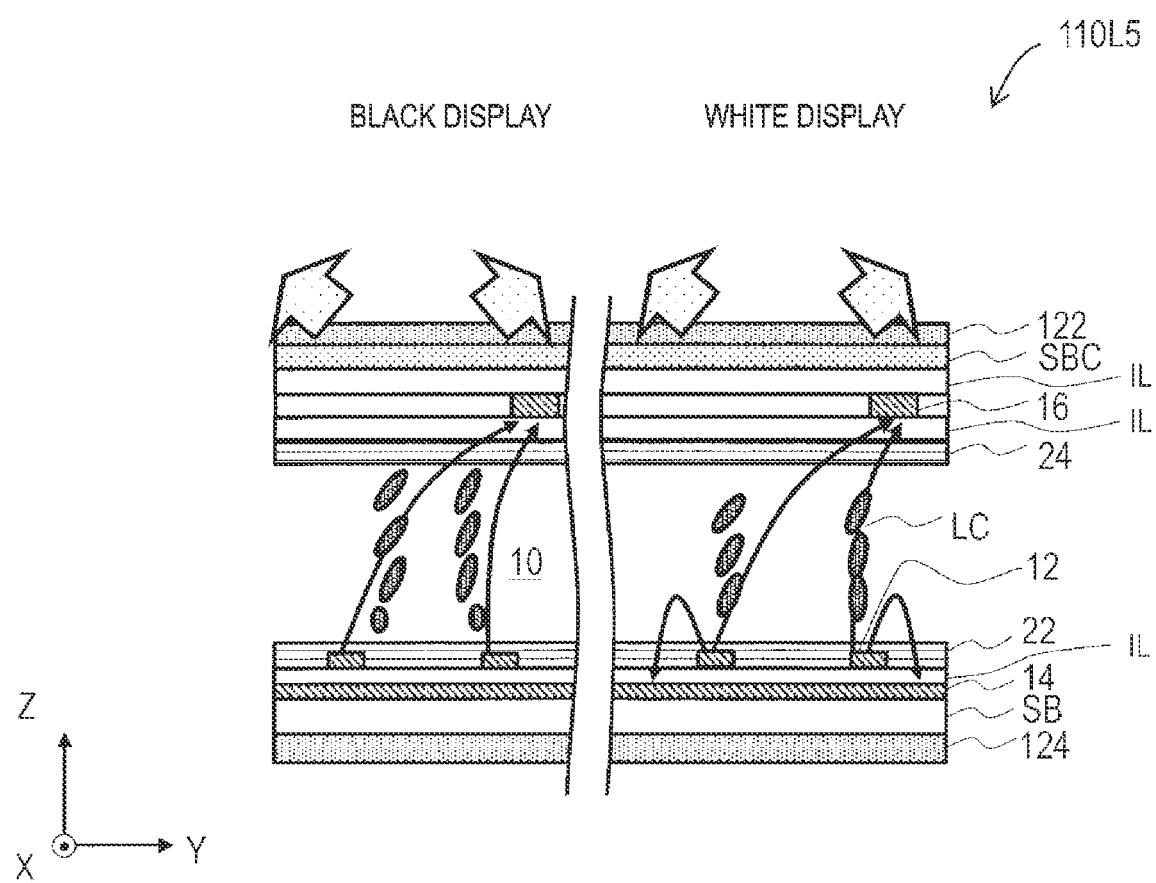
FIG. 22 is a schematic cross-sectional view of the liquid crystal element layer 110L5 (illumination mode).

A liquid crystal element layer 110L5 will be described with reference to FIGS. 19 to 22. FIG. 19 is a schematic plan view of the pixel PX of the liquid crystal element layer 110L5. FIG. 20 is a schematic isocontrast line diagram of the liquid crystal element layer 110L5. FIG. 21 is a schematic cross-sectional view (display mode) of the liquid crystal element layer 110L5. FIG. 22 is a schematic cross-sectional view (illumination mode) of the liquid crystal element layer 110L5.

As illustrated in FIGS. 19, 21, and 22, in the liquid crystal element layer 110L5, the electrode 16 in the liquid crystal element layer 110L4 is unevenly distributed on an upper side of the pixel in the perpendicular direction (Y-axis direction) of the first display surface 100DS. As a result, when a vertical electrical field is generated, the liquid crystal molecules LC rise obliquely along the electrical field, and thus a viewing angle characteristic is biased as in the isocontrast line diagram illustrated in FIG. 20, and intensity of irradiation light to the reflection-type display panel can be increased. At the same time, unnecessary upward light leakage can also be suppressed.

By adopting this configuration and increasing an area (for example, a width in the perpendicular direction) of the electrode 16 in the pixel from the top to the bottom of the display surface, the intensity of the irradiation light to the reflection-type display panel can be increased.

Figure 23:
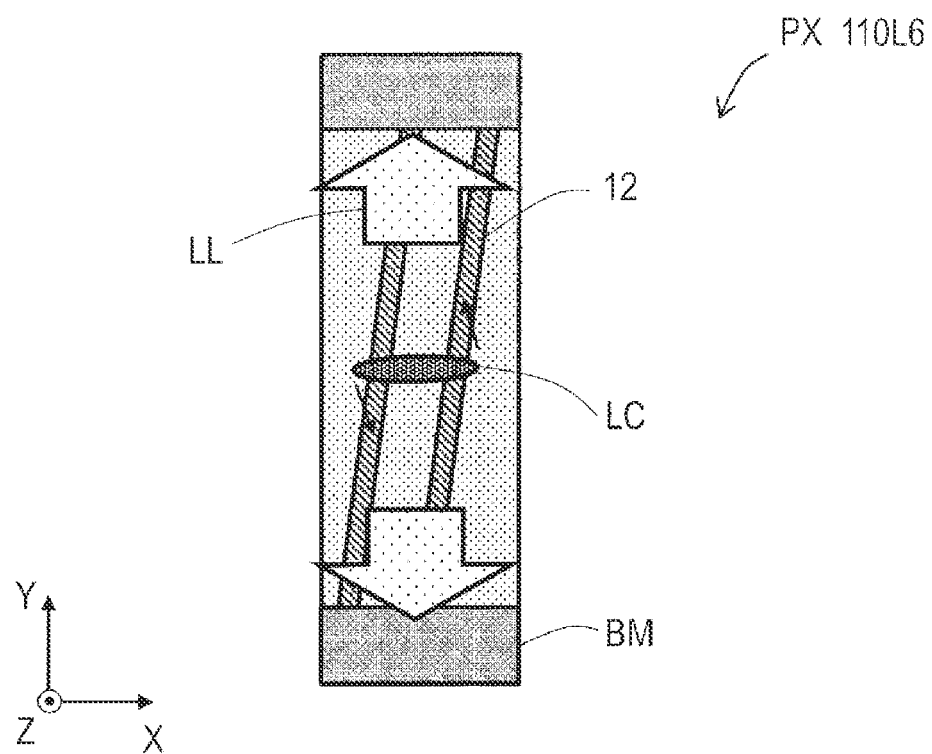
FIG. 23 is a schematic plan view of the pixel PX of a liquid crystal element layer 110L6.
Figure 24:
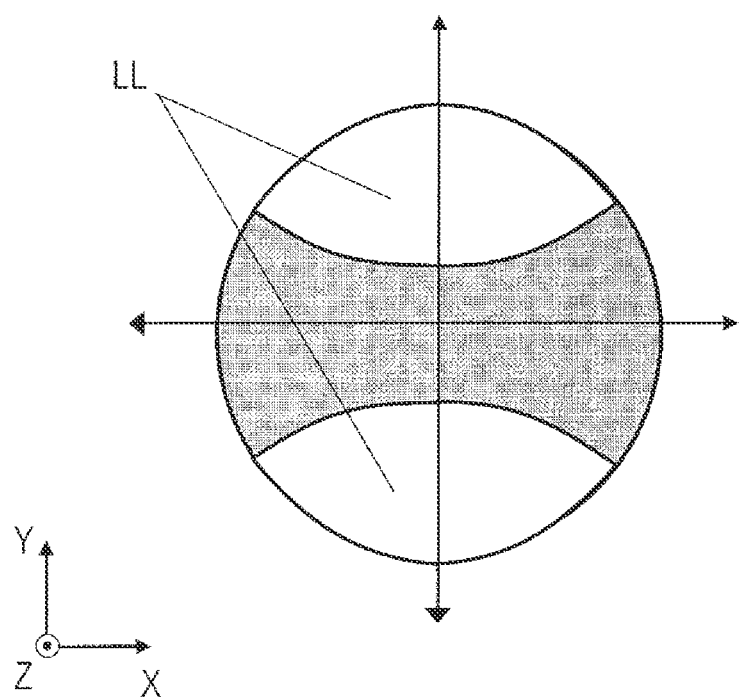
FIG. 24 is a schematic isocontrast line diagram of the liquid crystal element layer 110L6.
Figure 25:
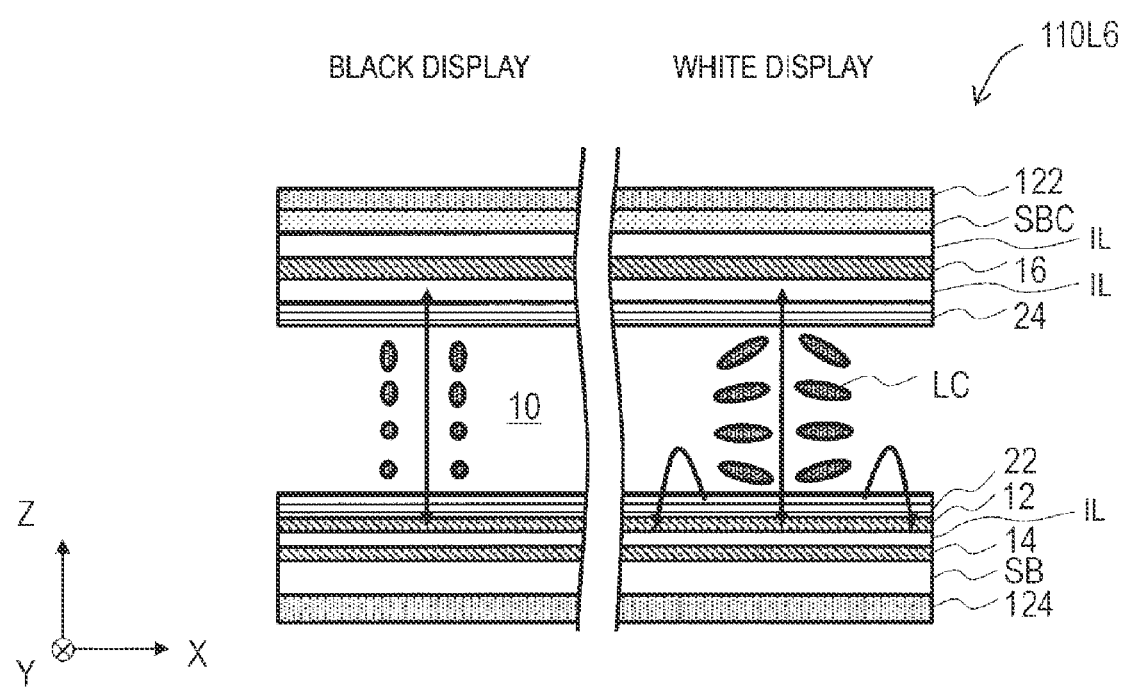
FIG. 25 is a schematic cross-sectional view of the liquid crystal element layer 110L6 (display mode).
Figure 26:
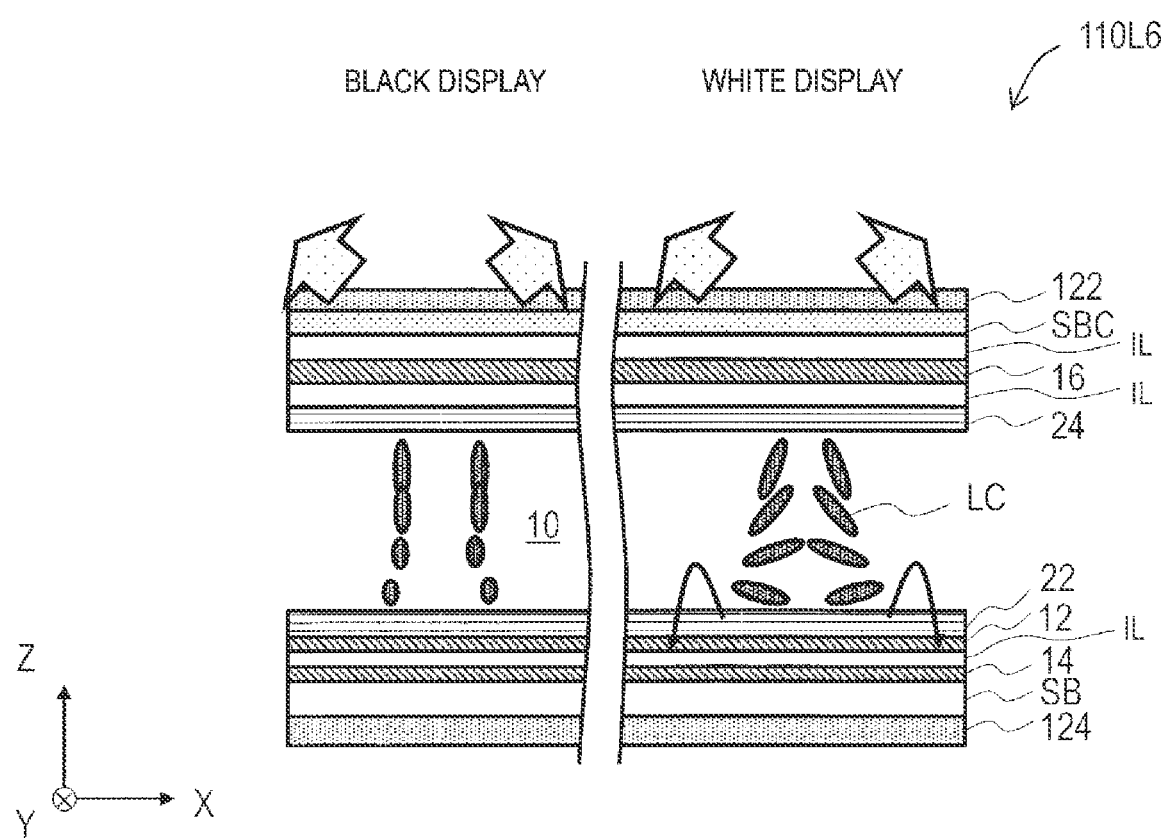
FIG. 26 is a schematic cross-sectional view of the liquid crystal element layer 110L6 (illumination mode).

A liquid crystal element layer 110L6 will be described with reference to FIGS. 23 to 25. FIG. 23 is a schematic plan view of the pixel PX of the liquid crystal element layer 110L6. FIG. 24 is a schematic isocontrast line diagram of the liquid crystal element layer 110L6. FIG. 25 is a schematic cross-sectional view (display mode) of the liquid crystal element layer 110L6. FIG. 26 is a schematic cross-sectional view (illumination mode) of the liquid crystal element layer 110L6.

Similarly to the liquid crystal element layers 110L4 and 110L5, the liquid crystal element layer 110L6 is a liquid crystal element layer in a transverse electrical field mode (for example, the FFS mode), but the liquid crystal element layer 110L6 is configured such that the liquid crystal molecule in the liquid crystal layer 10 of the liquid crystal element layer 110L6 has negative dielectric anisotropy, and a transverse electrical field substantially parallel to the horizontal direction (X-axis direction) of the first display surface 100DS is applied. Similarly to the liquid crystal element layer 110L4, the liquid crystal element layer 110L6 includes the electrode 16 for further applying a vertical electrical field to the liquid crystal layer 10, and performs display in the HAN mode. As illustrated in FIG. 23, the pixel PX has a shape elongated in the vertical direction (Y-axis direction), and the leakage light LL leaks in the vertical direction (Y-axis direction) and indicates an isocontrast line as illustrated in FIG. 24.

The liquid crystal molecules LC of the liquid crystal layer 10 of the liquid crystal element layer 110L6 in the HAN mode are horizontally aligned by the alignment film 22 on the fringe electrical field side and vertically aligned by the alignment film 24 on the color substrate side. When a vertical electrical field is applied, the liquid crystal molecules LC are horizontally aligned. In the display mode, as illustrated in FIG. 25, a fringe electrical field and a vertical electrical field are applied. In the illumination mode, as illustrated in FIG. 26, only a fringe electrical field is used.

A characteristic feature of the liquid crystal element layer 110L6 is that the amount of light leakage in the vertical direction tends to be great, resulting in high performance as illumination. On the other hand, when a vertical electrical field is applied, the liquid crystal molecules at an interface on the vertical alignment side are not completely horizontal due to an influence of an alignment regulating force, and a viewing angle characteristic tends to be deteriorated.

INDUSTRIAL APPLICABILITY

The electronic device according to the embodiments of the disclosure can perform reflective display of high quality. The electronic device according to the disclosure is suitably used as a notebook computer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. An electronic device comprising:
a first display panel including a first display surface; and
a second display panel including a second display surface and configured to be disposed such that light emitted from the first display surface is incident on the second display surface,
wherein the first display panel is configured such that the light emitted from the first display surface and incident on the second display surface includes a large amount of P-polarization components,
the second display panel is a reflection-type display panel, and further includes a polarizer disposed on the second display surface and configured to absorb S-polarization components of incident light,
the first display panel is a transmission-type display panel,
the first display panel further includes a liquid crystal element layer, a first polarizer having an absorption axis parallel to a horizontal direction of the first display surface, a second polarizer having an absorption axis in a direction of absorbing a polarization component in a perpendicular direction of the first display surface, and a backlight,
the first polarizer and the second polarizer face each other with the liquid crystal element layer interposed therebetween,
the first display panel is further configured to display in a normally black mode, and the second polarizer has an absorption axis inclined downward in the perpendicular direction of the first display surface from a normal direction of the first display surface.

2. The electronic device according to claim 1,
wherein the first polarizer is disposed on a first display surface side of the liquid crystal element layer.

3. The electronic device according to claim 2, further comprising:
a third polarizer disposed on a side opposite the liquid crystal element layer of the second polarizer, and having an absorption axis or a reflection axis parallel to the perpendicular direction of the first display surface.

4. The electronic device according to claim 2,
wherein the liquid crystal element layer
is a liquid crystal element layer in a transverse electrical field mode,
is configured such that a liquid crystal molecule in a liquid crystal layer of the liquid crystal element layer has positive dielectric anisotropy, and a transverse electrical field substantially parallel to the perpendicular direction of the first display surface is applied, and
is further configured to apply a vertical electrical field to the liquid crystal layer.

5. The electronic device according to claim 4,
wherein the liquid crystal element layer includes a plurality of pixels, and
the vertical electrical field is configured to be generated by an electrode unevenly distributed on an upper side of each of the plurality of pixels in the perpendicular direction of the first display surface.

6. The electronic device according to claim 2,
wherein the liquid crystal element layer
is a liquid crystal element layer in a transverse electrical field mode,
is configured such that a liquid crystal molecule in a liquid crystal layer of the liquid crystal element layer has negative dielectric anisotropy, and a transverse electrical field substantially parallel to the horizontal direction of the first display surface is applied,
is further configured to apply a vertical electrical field to the liquid crystal layer, and
displays in a hybrid alignment nematic (HAN) mode.

7. The electronic device according to claim 1,
wherein the second polarizer is disposed on a first display surface side of the liquid crystal element layer.

8. The electronic device according to claim 7,
wherein the liquid crystal element layer is a liquid crystal element layer in a transverse electrical field mode, and a liquid crystal molecule in a liquid crystal layer of the liquid crystal element layer has positive dielectric anisotropy and is pre-tilted with a slow axis inclined downward in the perpendicular direction of the first display surface from the normal direction of the first display surface.

9. The electronic device according to claim 8, further comprising:
a phase difference plate disposed between the liquid crystal element layer and the first polarizer or the second polarizer disposed on the first display surface side,
wherein the phase difference plate has a slow axis inclined upward in the perpendicular direction of the first display surface from the normal direction of the first display surface.

10. The electronic device according to claim 8,
wherein the liquid crystal element layer is configured to apply a vertical electrical field to the liquid crystal layer.

11. The electronic device according to claim 7,
wherein the liquid crystal element layer is configured to apply a transverse electrical field substantially parallel to the horizontal direction of the first display surface.

12. The electronic device according to claim 7,
wherein an inclination angle of the inclined absorption axis of the second polarizer from the normal direction is less in a lower portion than in an upper portion of the first display surface.

13. The electronic device according to claim 7,
wherein the liquid crystal element layer includes a plurality of pixels,
each of the plurality of pixels has a region including a color filter layer and a transparent region, and
a liquid crystal layer in the transparent region is always in a black display state.

14. The electronic device according to claim 7, further comprising:
a third polarizer disposed on a side opposite the liquid crystal element layer of the first polarizer, and having an absorption axis or a reflection axis parallel to the horizontal direction of the first display surface.

15. The electronic device according to claim 1, further comprising:
a processor and a storage device.

* * * * *